Figure 1:
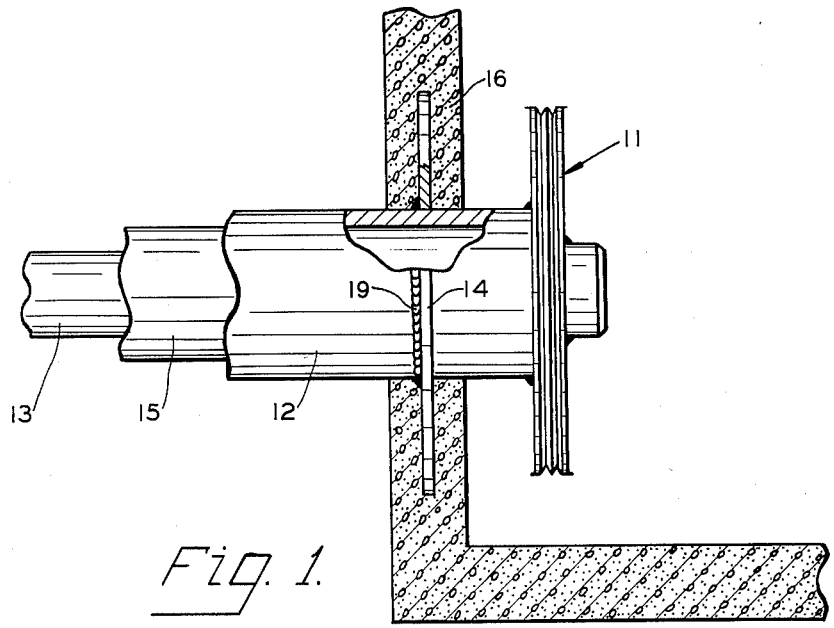

July 5, 1966  D. L. WYATT  3,259,402

EXPANSIBLE END SEAL

Filed June 14, 1963

INVENTOR.
DAVID L. WYATT
BY Watts & Fisher
ATTORNEYS.

United States Patent Office 3,259,402
Patented July 5, 1966

3,259,402
EXPANSIBLE END SEAL
David L. Wyatt, Barberton, Ohio, assignor to Ric-Wil, Incorporated, Barberton, Ohio, a corporation of Ohio
Filed June 14, 1963, Ser. No. 287,997
5 Claims. (Cl. 285—133)

The present invention relates generally to conduit systems and more particularly to a mechanism for effecting a seal between a fluid conducting pipe and a surrounding casing.

The conduit seal of the present invention is particularly suitable for use with conduit systems used for transporting steam and other fluids at varying temperatures and/or temperatures differing from ambient temperatures. Such conduit systems are often constructed of prefabricated units where each unit comprises a fluid conveying pipe, surrounded by a tube of insulating material, which in turn is surrounded by an outer casing. The pipe and casing are held in appropriate radially spaced relationship by suitable pipe supports.

Since such units are subject to variations in temperature they are also subject to expansion and contraction. For this reason expansion absorbing devices such as loops and joints are provided at spaced locations along the conduit system. In order to assure proper distribution of the conduit expansion and contraction among the various expansion devices, the system is anchored at spaced locations with suitable anchors such as that shown in United States Patent No. Re. 22,988, issued to William S. McLeish.

When the conduit system passes through the wall of a building, a pit, or a manhole, the outer casing usually terminates at such wall and only the fluid conveying pipe extends beyond the inner face of the wall. A conduit seal is provided between the fluid pipe and the outer casing to prevent the entry of moisture and other contaminants which lessen or even destroy the insulating ability of the insulating material surrounding the pipe. Where the conduit terminates five feet or less from an anchor point there is little relative movement between the pipe and the casing and an ordinary end seal is sufficient. Such an end seal is often a plate which is fixed as by welding to both the pipe and the conduit in a fluid tight relation. Where the conduit terminates more than five feet from an anchor point the conduit seal must permit expansive movement of the pipe relative to the casing. Seals suitable for this purpose are called "gland" seals.

Gland seals generally comprise a suitable packing material surrounding the pipe, a stuffing box structure connected to the outer casing and surrounding the pipe, and an annular member movable relative to the box to compress the packing between the box and the pipe to effect a seal. This type of gland seal generally requires periodic maintenance and frequent repacking. One new and improved gland seal not having the packing material construction of other gland seals and, therefore, not requiring maintenance and repacking is found in a copending application entitled "Flexible Diaphragm Type Conduit Seal," Serial No. 270,295, filed April 3, 1936 by Joseph L. Martin.

In many conduit installations where the casing terminates near an anchor the amount of pipe expansion may be only nominal. However, since there is some pipe expansion, a regular end seal is not satisfactory. Thus, in the past it has been necessary to use the gland seal construction to accommodate even such nominal pipe expansion. This is very undesirable because gland seals are more complicated and expensive and require maintenance whereas the end seals normally do not. It is therefore preferred that the terminal ends of casings be sealed to the pipes by an end seal construction rather than by a gland seal construction.

In the past in those installations where no appreciable pipe expansion was expected and a prior end seal was used, it often happened that at least nominal pipe expansion did occur and caused the end seal to break from the pipe, casing or both. This opened the casing to the entry of moisture and other contaminates which caused corrosion of the pipe. In addition, the moisture or other contaminate permeated the installation surrounding the pipe and destroyed its insulating qualities. Since the prior end seals do not require regular maintenance and are rather infrequently inspected, especially where buried or submerged, such breaks are not usually detected until long after the damage has occurred. Thus, it is important that some type of conduit seal be provided which will accommodate nominal pipe expansion but will not require regular maintenance or the complicated structures of prior gland seals.

The present invention provides a conduit seal which fulfills all of the above requirements. The present conduit seal is an end seal which is sufficiently expansible to accommodate nominal amounts of pipe expansion which prior end seals would not accommodate. In the preferred form of the present expansible end seal, first and second plate members are fixed to the pipe and conduit respectively and are in a spaced relation. An annular corrugated band connects the plate members and completes a seal of the casing to the pipe. Expansive movement of the pipe is then accommodated by the entire assembly, as well as, by the bellows effect provided by the corrugated band.

Accordingly, an object of the present invention is to provide a new and improved conduit seal which permits expansive movement of the pipe relative to the casing and does not require any maintenance and repair.

Another object of the present invention is to provide a new and improved end seal construction which permits nominal amounts of pipe expansion.

Figure 2:
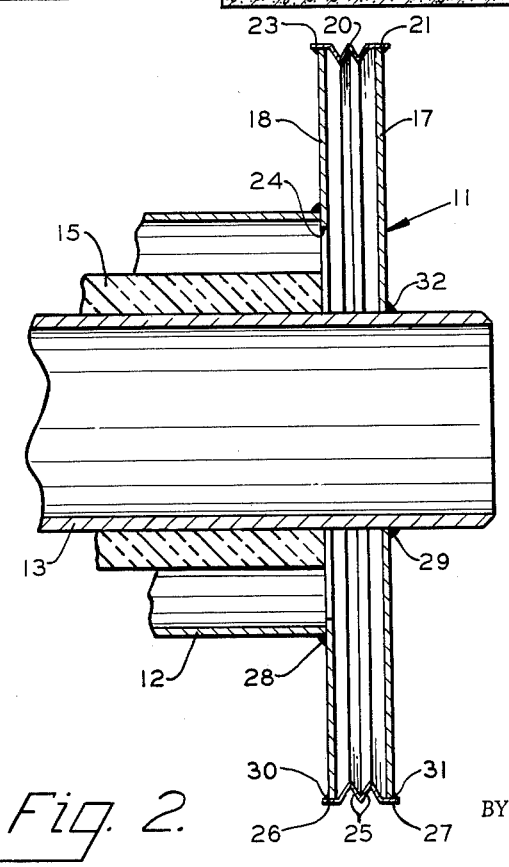

Other objects and a fuller understanding of the invention may be had by referring to the following description and claims taken in conjunction with the accompanying drawing in which:

FIGURE 1 is a plan view of the expansible end seal of the present invention as installed at the terminal end of a casing extending through the wall of a building or similar structure; and, FIGURE 2 is a sectional view, taken on a longitudinal plane, of the present expansible end seal.

Referring now to the drawing, a preferred form of the end seal as constructed according to the present invention is indicated generally by the reference character 11. The end seal 11 is secured to the end of a casing 12 and surrounds a pipe 13. The pipe 13 is supported in spaced-insulated relation to the casing 12 throughout the conduit system. The space between the pipe and the casing is filled at least partially by an insulating material 15 which surrounds the pipe 13. In FIGURE 1, the end seal 11 is shown disposed on the interior side of a building wall 16 through which the conduit extends. An apertured circular leak plate 14 is fixed, as by a circumferential weld 19, to the outer surface of the casing 12 and extends radially from around the casing 12 and into the wall 16. The leak plate 14 as thus embedded in the wall 16 and sealed to the casing 12 by the circumferential weld 19 substantially prevents the leakage of fluids between the wall 16 and the casing 12.

As shown more clearly in FIGURE 2, the end seal 11 comprises spaced plate members 17, 18 and a corrugated band 20. The plate members 17, 18 and the metal band 20 are preferably made of a metal or other suitable material. The plate 17 is an apertured, disc-like member having an outer circular edge 21 defining the perimeter of the plate member 17 and an inner circular edge 22 defining a circular opening or aperture which is sized to receive the pipe 13. The second plate member 18 is also an apertured, disc-like member having an outer circular edge 23 defining the perimeter of the plate member 18 and an inner circular edge 24 defining a central pipe opening. The opening defined by the edge 24 has a diameter approximately equivalent to the inner diameter of the casing 12. The corrugated band 20 is a cylindrical metal band having V-shaped corrugations 25 extending circumferentially between cylindrical end portions 26, 27.

The plate member 18 is disposed around the pipe 13 and is secured to the terminal end of the casing 12 as by a circumferential weld 28. The plate member 17 is disposed around the pipe 13 spaced from the terminal end of the casing 12. The plate member 17 is secured to the pipe 13 as by a circumferential weld 29. As thus arranged, the plate members 17, 18 are in spaced, parallel planes extending radially from the longitudinal axis of the conduit system. The plate members 17, 18 have substantially the same outer diameters so that their perimeters are in longitudinal alignment. The corrugated band 20 is disposed around the perimeters of both plate members 17, 18 and encloses the expansion space between them. The cylindrical end portions 26, 27 are secured respectively to the plate members 18, 17 as by circumferential welds 30, 31 respectively.

The plate members 17, 18 and the corrugated band as secured to each other, to the pipe 13, and to the casing 12 by the circumferential welds 28–31 provide a fluid-tight seal between the pipe 13 and the terminal end of the casing 12. The corrugations 25 in the corrugated band 20 permit expansive movement of the pipe 13 in either direction relative to the casing 12.

The outer diameters of the plate members 17, 18 are much greater than the outer diameter of the casing and, as shown in the drawing, extend to approximately twice the diameter of the casing 12. This permits additional expansive movement since the plate members 17, 18 also yield slightly toward or away from one another when the pipe 13 moves relative to the casing 12.

An advantage of the present end seal is that it is expansible and, in addition, it is simple in construction. The present end seal construction is very durable and permits expansive movement of the pipe 13 relative to the casing 12 greater than the expansion space normally between the plate members 17, 18 when the device is relaxed and untensed. For example, in tests conducted on a five inch pipe disposed concentrically within a ten inch conduit with the plate members 17, 18 extending to approximately nineteen inches on their outer diameter and less than two inch spacing between the plate members as provided by a two inch wide corrugated band having two corrugations running its entire circumference, the end seal was subject to a pipe movement of three and one-half inches without failure. At this point, severe distortion of the assembly was noted but there was no apparent cracking in the circumferential welds or elsewhere. Although the tested expansible end seal would normally not encounter three and one-half inches of pipe movement in an actual installation, the results of the tests do illustrate the extreme pipe movement which the present end seal may accommodate.

In summary, the present invention may be described as comprising essentially an expansible end seal comprising a pair of spaced plate securement members, one secured to the casing and the other secured to the pipe, and an outer circumferential corrugated band connecting the securement members and completing the seal.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a conduit system having an outer casing in spaced, insulated relation around an inner fluid conveying pipe mounted for expansive axial movement relative to the casing, an improved conduit seal for sealing a terminal end of the casing to the pipe, the pipe extending beyond such terminal end, said conduit seal comprising:
   (a) first and second apertured plates, one of said apertured plates being secured to the terminal end of the casing in a fluid tight connection, the other of said apertured plates receiving the pipe within its aperture and being secured to the pipe in a fluid tight connection;
   (b) said plates being axially spaced at their connections to the casing and pipe respectively and at their outer perimeters;
   (c) a band extending between the spaced plates in radially spaced relation to the casing, said band being attached to the plates adjacent their perimeters and providing a perimetrical fluid tight connection between their spaced perimeters;
   (d) said plates being sized so as to extend radially substantially beyond the outer surface of the casing and being flexible to accommodate movement of the pipe relative to the casing; and,
   (e) said band being sized and formed to provide flexibility longitudinally of the pipe and casing and permit relative movement of the connected perimeters of the plates.

2. The device of claim 1 wherein the distance said plates extend beyond the outer surface of the casing is substantially the radius of the casing.

3. In a conduit system having an outer casing in spaced insulated relation around an inner fluid conveying pipe mounted for expansive axial movement relative to the casing, an improved conduit seal for sealing a terminal end of the casing to the pipe which extends beyond such terminal end, said conduit seal comprising:
   (a) a first apertured plate member being secured to the terminal end of the casing in a fluid-tight connection, said first plate member extending radially outward from all around the terminal end of the casing to an outer perimeter;
   (b) a second apertured plate member receiving the pipe within its aperture and being secured to the pipe in a fluid-tight connection spaced longitudinally from said first plate member, said second plate member extending radially outward from all around the pipe to an outer perimeter substantially aligned with the perimeter of the first plate member;
   (c) a band member extending between the plate members in spaced relation to the casing, said band being welded to the plate members adjacent their perimeters and providing a perimetrical fluid tight connection between them;
   (d) said first and second plate members being sized so as to extend substantially radially beyond the outer surface of the casing and so as to have sufficient flexibility to accommodate axial movement of the pipe relative to the casing; and,
   (e) said band member being sized and formed so as to be at least flexible longitudinally of the pipe and casing and to accommodate relative movement of the connected perimeters of the plate members.

4. The device of claim 3 wherein the perimeters of the plate members are circular and the band member has at least one corrugation disposed between the plate members.

5. The device of claim 3 wherein the band member is corrugated between said plate members and adjacent to said plate members.

(References on following page)

References Cited by the Examiner

UNITED STATES PATENTS

| | | | |
|---|---|---|---|
| 2,209,325 | 7/1940 | Dennis | 285—300 |
| 2,478,552 | 8/1949 | Williamson | 138—149 |
| 2,779,609 | 1/1957 | Portney et al. | 285—299 X |
| 2,840,394 | 6/1958 | Rohr | 285—300 X |
| 2,920,908 | 1/1960 | Mitchell | 285—299 X |

FOREIGN PATENTS 50,933  11/1935  Denmark.

LAVERNE D. GEIGER, *Primary Examiner.*

EDWARD V. BENHAM, *Examiner.*

C. HOUCK, *Assistant Examiner.*